United States Patent
Fitzgerald et al.

(10) Patent No.: US 9,747,174 B2
(45) Date of Patent: Aug. 29, 2017

(54) TAIL OF LOGS IN PERSISTENT MAIN MEMORY

(71) Applicant: Microsoft Technology Licensing, LLC, Redmond, WA (US)

(72) Inventors: Robert Patrick Fitzgerald, Fall City, WA (US); Per-Ake Larson, Redmond, WA (US); Michael James Zwilling, Bellevue, WA (US); Cristian Diaconu, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 82 days.

(21) Appl. No.: 14/966,724

(22) Filed: Dec. 11, 2015

(65) Prior Publication Data

US 2017/0168904 A1   Jun. 15, 2017

(51) Int. Cl.
*G06F 11/07*    (2006.01)
*G06F 11/14*    (2006.01)
*G06F 3/06*     (2006.01)

(52) U.S. Cl.
CPC ........ *G06F 11/1471* (2013.01); *G06F 3/0619* (2013.01); *G06F 3/0646* (2013.01); *G06F 3/0653* (2013.01); *G06F 3/0673* (2013.01)

(58) Field of Classification Search
CPC .......................... G06F 11/1405; G06F 11/1407
USPC ..................................................... 714/15, 19
See application file for complete search history.

(56) References Cited

U.S. PATENT DOCUMENTS

| | | | |
|---|---|---|---|
| 7,065,537 B2 | 6/2006 | Cha et al. |
| 7,249,150 B1 | 7/2007 | Watanabe et al. |
| 7,383,290 B2 | 6/2008 | Mehra et al. |
| 7,483,911 B2 | 1/2009 | Cherkauer |
| 7,509,351 B2 | 3/2009 | Lomet et al. |
| 7,730,153 B1 | 6/2010 | Gole et al. |
| 7,801,866 B1 | 9/2010 | Kathuria et al. |
| 8,121,980 B2 | 2/2012 | Reid et al. |
| 8,706,687 B2 | 4/2014 | Fineberg et al. |
| 8,806,115 B1 | 8/2014 | Patel et al. |
| 8,856,469 B2 | 10/2014 | Jin et al. |
| 8,898,388 B1 | 11/2014 | Kimmel |

(Continued)

OTHER PUBLICATIONS

International Search Report and the Written Opinion issued in PCT Application No. PCT/US2016/064510 mailed Feb. 23, 2017.

(Continued)

*Primary Examiner* — Chae Ko
(74) *Attorney, Agent, or Firm* — Workman Nydegger

(57) ABSTRACT

A system that uses a persistent main memory to preserve events that await logging in a persistent store. Each event is written into the persistent main memory so as to be loggable in case of recovery. For instance, the event may be written into a log cache structure, along with other state which identifies that the event is in the particular log cache structure, the location of the event within the particular log cache structure, and the order of the event. To recover, the log in the persistent store is evaluated to identify the end of the stored log. The tail of the log is identified in the persistent main memory by identifying any log cache structures that are after the end of the stored log and which are validly recoverable. The log cache structure contents are then serialized one log cache at a time, earliest first.

20 Claims, 9 Drawing Sheets

(56) References Cited

U.S. PATENT DOCUMENTS

| | | | | |
|---|---|---|---|---|
| 2004/0103123 | A1* | 5/2004 | Bradshaw | G06F 17/30008 |
| 2004/0220961 | A1* | 11/2004 | Lee | G06F 11/1471 |
| 2006/0167895 | A1 | 7/2006 | Shim | |
| 2006/0211415 | A1* | 9/2006 | Cassett | H04W 24/04 |
| | | | | 455/423 |
| 2009/0287890 | A1* | 11/2009 | Bolosky | G06F 3/061 |
| | | | | 711/155 |
| 2014/0040208 | A1* | 2/2014 | Graefe | G06F 17/30362 |
| | | | | 707/648 |
| 2014/0297595 | A1 | 10/2014 | Larson et al. | |
| 2016/0092223 | A1* | 3/2016 | Wang | G06F 9/3004 |
| | | | | 712/208 |
| 2016/0294614 | A1* | 10/2016 | Searle | H04L 41/082 |
| 2016/0306713 | A1* | 10/2016 | Diaconu | G06F 11/1451 |

OTHER PUBLICATIONS

Wang, et al., "Scalable Logging through Emerging Non-Volatile Memory", In Proceedings of the VLDB Endowment, vol. 7, No. 10, Sep. 1, 2014, pp. 865-876.

Debrabant, et al., "A Prolegomenon on OLTP Database Systems for Non-Volatile Memory", In Proceedings of the VLDB Endowment, vol. 7, No. 14, Sep. 2014, 7 pages.

Huang, et al., "NVRAMaware Logging in Transaction Systems", In Proceedings of the VLDB Endowment, vol. 8, No. 4, Aug. 31, 2015, pp. 389-400.

* cited by examiner

TAIL OF LOGS IN PERSISTENT MAIN MEMORY

BACKGROUND

For a wide variety of reasons, computing systems often keep a log of certain events. Such logs may be helpful for diagnosing emergent or existing problems, recovering from a failure of the computing system, performing incremental backup of the computing system, tracking computing performance, evaluating security, and so forth.

Some logs are persisted on disk in order to survive system failure. After all, some logs have their purpose in being used after a system failure, such as when used for recovery, or to diagnose reasons for the failure. When the log is persisted on disk, the events are often first written to a volatile log cache (often called an "LC") in volatile memory. Each log cache is often sized so that it may be serialized and written to disk in a single I/O operation, thereby preserving use of the I/O channel with the disk. The use of such a log cache is helpful in that it reduces the number of I/O operations to disk.

Once the log cache is filled (or after a certain time has elapsed), the contents of the log cache are serialized and written to disk, and another empty log cache is made available to capture (at least in volatile memory) further events. This process is repeated, thereby cycling through a number of log caches. Once the contents of a particular log cache are confirmed as being written to the log on disk, the one or more threads that initiated writes of events into that log cache are then released back to the event provider(s). While the threads are awaiting release, they may often be put to sleep so as to reduce overhead associated with the thread.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to a system that uses a persistent main memory in order to preserve events that have not yet been written to a log of a persistent store. When events are to be written into a log of the persistent store, the event is written into the persistent main memory so as to be interpretable in case of recovery. For instance, the event may be written into a log cache structure in the persistent main memory, along with other state which identifies that the event is in the particular log cache structure, the location of the event within the particular log cache structure, and the order of the event amongst other events written into the particular log cache structure.

The thread that initiated the write may return immediately once the event and corresponding state is written to the persistent main memory. This is because recovery may be performed for that event based on the content of the persistent main memory even if the event has not been flushed (e.g., along with the other content of the log cache structure) in the log in the persistent store. This dramatically reduces latency by orders of magnitude between the time that the thread initiates the write, and the time that the thread is released for other work. Conventionally, any threads that initiated writes of events to a log cache had to wait for the confirmation that the contents of the log cache had been written to the persistent store. This resulted in latency from not just the I/O operation to the persistent store itself, but also from waiting for the log cache to fill sufficiently to initiate that I/O operation in the first place.

Although not required, in some embodiments, corresponding log caches may also exist in a volatile memory, which mirror the log cache structures in the persistent main memory. This allows the content of the log cache to be pre-serialized and serialized just as it normally would be (regardless of the exact mechanism for pre serialization and serialization) from the volatile log cache, still allowing the content of the persistent main memory to be used in case of failure causing loss of content of the volatile memory. Thus, these embodiments minimize impact on existing event logging infrastructures that use volatile memory log caches. Furthermore, these embodiments reduce the number of changes needed to the persistent main memory since the persistent main memory need not track each possible pre-serialization state.

To recover, the log in the persistent store is evaluated to identify the end of the stored log. The tail of the log is then identified in the persistent main memory by identifying one or more log cache structures that have events after the end of the stored log and which are validly usable for recovery (e.g., which have a state between atomic event write operations). The content of each of these identified log cache structures are then serialized taking one log cache structure at a time, earliest first. For instance, if volatile log caches are also used, the contents may be copied into the volatile log cache, after which the volatile log cache is pre-serialized and serialized as normal. This is what alleviates the need for the persistent main memory itself to have to track the log cache state during pre-serialization.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
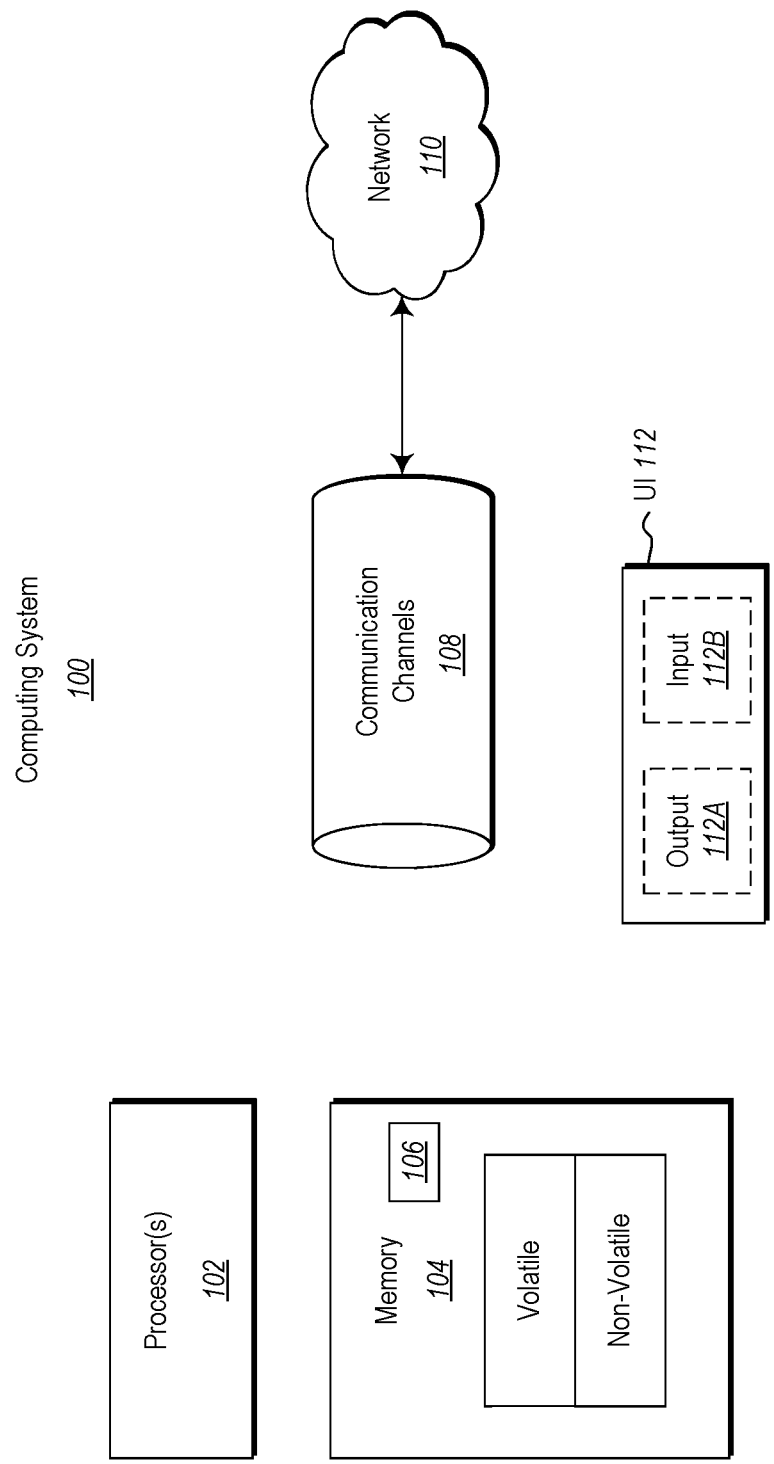
FIG. 1 illustrates an example computing system in which the principles described herein may be employed.

At least some embodiments described herein relate to a system that uses a persistent main memory in order to preserve events that have not yet been written to a log of a persistent store. When events are to be written into a log of the persistent store, the event is written into the persistent main memory so as to be interpretable in case of recovery. For instance, the event may be written into a log cache structure in the persistent main memory, along with other state which identifies that the event is in the particular log cache structure, the location of the event within the particular log cache structure, and the order of the event amongst other events written into the particular log cache structure.

The thread that initiated the write may return immediately once the event and corresponding state is written to the persistent main memory. This is because recovery may be performed for that event based on the content of the persistent main memory even if the event has not been flushed (e.g., along with the other content of the log cache structure) in the log in the persistent store. This dramatically reduces latency by orders of magnitude between the time that the thread initiates the write, and the time that the thread is released for other work. Conventionally, any threads that initiated writes of events to a log cache had to wait for the confirmation that the contents of the log cache had been written to the persistent store. This resulted in latency from not just the I/O operation to the persistent store itself, but also from waiting for the log cache to fill sufficiently to initiate that I/O operation in the first place.

Although not required, in some embodiments, corresponding log caches may also exist in a volatile memory, which mirror the log cache structures in the persistent main memory. This allows the content of the log cache to be pre-serialized and serialized just as it normally would be (regardless of the exact mechanism for pre-serialization and serialization) from the volatile log cache, still allowing the content of the persistent main memory to be used in case of failure causing loss of content of the volatile memory. Thus, these embodiments minimize impact on existing event logging infrastructures that use volatile memory log caches. Furthermore, these embodiments reduce the number of changes needed to the persistent main memory since the persistent main memory need not track each possible pre-serialization state.

To recover, the log in the persistent store is evaluated to identify the end of the stored log. The tail of the log is then identified in the persistent main memory by identifying one or more log cache structures that have events after the end of the stored log and which are validly usable for recovery (e.g., which have a state between atomic event write operations). The content of each of these identified log cache structures are then serialized taking one log cache structure at a time, earliest first. For instance, if volatile log caches are also used, the contents may be copied into the volatile log cache, after which the volatile log cache is pre-serialized and serialized as normal. This is what alleviates the need for the persistent main memory itself to have to track the log cache state during pre-serialization.

Some introductory discussion of a computing system will be described with respect to FIG. 1. Then, the logging and recovery operations will be described with respect to FIGS. 2 through 7.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
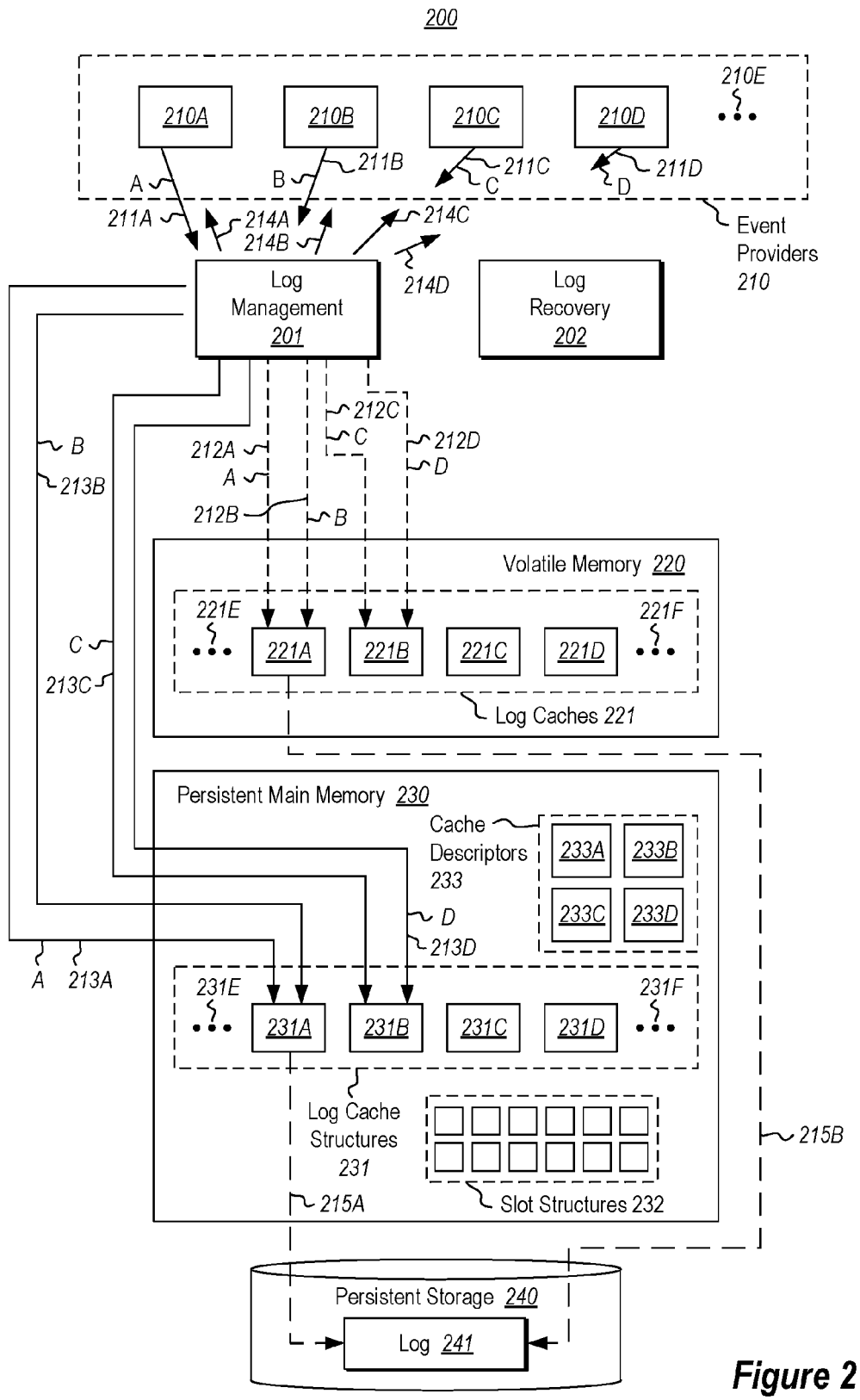
FIG. 2 illustrates a system in accordance with the principles described herein, in which a log management component may log events with low latency in a manner that should failure occur, a recovery component may successful recover.

FIG. 2 illustrates a system 200 in accordance with the principles described herein. The system includes a log management component 201 and a log recovery component 202, which may be structured as described above for the executable component 106 of FIG. 1. Furthermore, the system 200 may be structured as described above for the computing system 100 of FIG. 1. The log management component 201 causes events to be written to a persistent main memory 230 such that they will either be written to the log 241 through normal operation or recovery operation (in other words, such the logging of the event is virtually certain if not absolutely certain).

The system 200 includes a set 210 of event providers that provides events to the log management component 201 for logging. For instance, in an example, event provider 210A first provides an event (called hereinafter "event A") as represented by arrow 211A; event provider 210B then provides an event (called hereinafter "event B") as represented by arrow 211B; event provider 210C then provides an event (called hereinafter "event C") as represented by arrow 211C; and event provider 210D then provides an event (called hereinafter "event D") as represented by arrow 211D. Accordingly, in this example, log management component 201 receives the following events for logging in this order: event A, event B, event C, and event D. The rate at which the log management component 201 receives events for logging may vary over time.

The event providers 210 are illustrated as including four event providers 210A, 210B, 210C and 210D. However, the principles describe herein are independent of how many event providers are providing events into the log. Accordingly, the ellipses 210E are provided to symbolize flexibility in the number of event providers providing events to be logged. The number of event providers actively providing events for logging may even fluctuate, possibly significantly, over time. However, the four event providers 210A through 210D are illustrated for purposes of example only and ease of reference. Event providers may be any software or hardware component or system, whether locally resident on the system 200 or whether remotely located.

As each event is received, the log management component 201 writes the events into a persistent main memory 230 in a manner that if failure was to occur prior to the event getting written to the log, the recovery component 202 would be able to provide the event to a log 241 that is stored in a persistent store 240 during recovery. However, if no recovery was needed, in the normal course of operation, the event would eventually end up identified within a log 241 that is stored in a persistent store 240. If a failure occurs, during subsequent recovery, the recovery component 202 is triggered to use the log 241 in persistent storage 240 as well as events written to the persistent main memory 230 in order to perform recovery.

Events that are successfully written to the persistent main memory 230 are written in a manner that the recovery component 202 will eventually operate to cause the event to be included within the log 241 of the persistent store 240. Accordingly, a successful write to the persistent main memory 230 ensures that the event will be logged even if a failure was to occur after the successful write. Accordingly, success of the writing of the event can be determined immediately upon a successful write of the event to the persistent main memory 230, rather than waiting until confirmation that the event has actually been written into the log 241 of the persistent store 240. Accordingly, the thread that initiated the write can be returned almost immediately, and once the write has successfully completed to the persistent main memory 230.

This results in orders of magnitude lower latency between the time that the thread initiates the write of the event until the time that the thread is released. Conventionally, any threads that initiated writes of events to a log cache had to collectively wait for the confirmation that the contents of the log cache had been written to the persistent store. This resulted in latency from not just the I/O operation to the persistent store itself, but also prior to that from waiting for the log cache to fill sufficiently to initiate that I/O operation in the first place.

More specifically, the persistent main memory 230 includes multiple log cache structures 231 into which events are written—one log cache structure at a time being ready for receiving events. For instance, four log cache structures 231A, 231B, 231C and 231D are illustrated in FIG. 2. However, the ellipses 231E and 231F represent that there may be other numbers as well. In one example, there may be over a hundred of such log cache structures. The log cache structures are filled with events until the log cache structure is full or until a certain time has elapsed, at which time the events corresponding to the log cache structure are serialized and placed into the log 241 via an I/O operation. In the example in which events A through D are to be logged, suppose that events A and B were written into one log cache structure 231A (as represented by respective arrows 213A and 213B), whereupon the log cache structure 231A is determined as filled (no longer accepting further events). At that point, the log cache structure 231B may become active, and the next events C and D are provided into the log cache structure 231B as represented by respective arrows 213C and 213D. Each log cache structure takes its turn in perhaps round robin fashion.

In one embodiment, there is also a volatile memory 220 in which the same events are written, with the volatile memory also including log caches 221 that mirror the log cache structures of the persistent main memory 230. For instance, volatile log cache 221A may correspond to persistent log cache structure 231A, both containing the same content, and even both perhaps being mirrored while they are being filled with events occupying the same relative space within the log caches. Likewise, volatile log caches 221B through 221D corresponding to persistent log cache structures 231B through 231D, respectively. Because there may be other persistent log cache structures as represented by ellipses 231E and 231F, there may be other volatile log caches as represented by ellipses 221E and 221F.

In the embodiment in which both volatile and persistent log caches are mirrored, events are written into both the volatile log cache and the corresponding persistent log cache structure. For instance, event A may be written into the volatile log cache 221A (as represented by dashed arrow 212A) at about the same time that the event A is written into the persistent log cache structure 231A (as represented by arrow 213A). Likewise, event B may be written into the volatile log cache 221A (as represented by dashed arrow 212B) at about the same time that the event B is written into the persistent log cache structure 231A (as represented by arrow 213B).

Furthermore, at this point, suppose that both corresponding log caches 221A and 231A are deemed full (either through actually being full or through the elapsing of time). At that point, the active mirrored log caches become mirrored log caches 221B and 231B. After that point, in the example of events A through D, event C may be written into the volatile log cache 221B (as represented by dashed arrow 212C) at about the same time that the event C is written into the persistent log cache structure 231B (as represented by arrow 213C). Subsequently, event D may be written into the volatile log cache 221B (as represented by dashed arrow 212D) at about the same time that the event D is written into the persistent log cache structure 231B (as represented by arrow 213D).

While this double writing may seem wasteful, it actually has a number of advantages. For instance, once the log cache is filled as much as it is going to be filled, there are often complex pre-serialization processes in which data of the log cache is moved around for efficient serialization and compact representation in the log. When designing pre-serialization, there are a number of judgment calls that result in different sequences of log cache state in the log cache. Accordingly, pre-serialization happens differently in different environments, over different products, and may even change over time in the same environment or versions or the same product.

If there were but a single log cache in the persistent main memory, these numerous pre-serialization changes would be tracked within that log cache structure. Otherwise, recovery should a failure occur in the middle of pre-serialization would be impossible to do with certainty. This tracking would significantly complicate the process of pre-serialization. Recovery processes would also be complicated because if failure occurred during a pre-serialization process, the recovery process would have to have additional logic to figure out where in the pre-serialization process the log cache structure was, so that recovery could continue from there.

Instead, all of the manipulations involved in pre-serializations may be confined to the volatile log cache. Existing products interact with the volatile log cache already in order to perform pre-serialization manipulations to the cache content and thus this would allow the pre-serialization and serialization to occur normally without change to existing products that perform pre-serialization. Furthermore, if failure was to occur during pre-serialization, resulting in a loss of content of the volatile log cache, the persistent log cache structure could simply be used to repopulate the volatile log cache to provide the volatile log cache with the original state it was in when the previous attempted pre-serialization started. The pre-serialization would then start again, resulting in the events of the volatile log cache being serialized into the log. Again, no changes to existing pre-serialization processes need to occur to allow this recovery to happen; and the complexity of tracking state changes during pre-serialization has been avoided.

Figure 3:
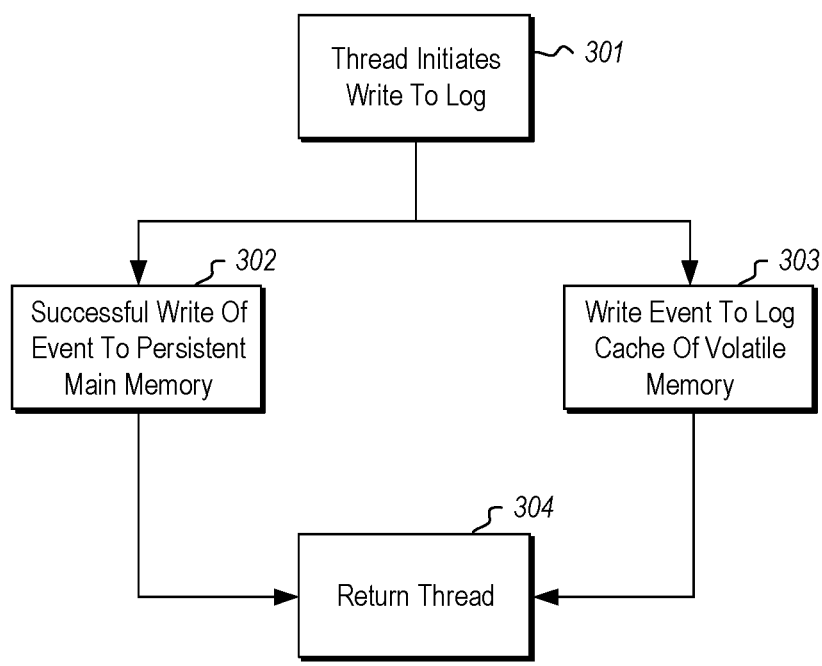
FIG. 3 illustrates a flowchart of a method for logging events of a computing system so as to enable the computing system to recover from a possible failure.

FIG. 3 illustrates a flowchart of a method 300 for logging events of a computing system so as to enable the computing system to recover from a possible failure. The method 300 may be performed by, for instance, the log management component 201 of FIG. 2. Accordingly, the method 300 of FIG. 3 will now be described with frequent reference to the system 200 of FIG. 2.

The method 300 is performed each time the log management component detects that a thread is writing an event to a log (act 301). In response, the event is written into a persistent main memory (act 302). This write occurs in a manner that the event will be written to the log, whether relatively soon during normal operation, or more eventually during recovery (e.g., as described further below) if a failure occurs. This will be referred to hereinafter as a "successful write" to the persistent main memory. Furthermore, if volatile memory is also used in log caching, the event is written into the volatile memory (act 303). In the case where volatile memory is also used, a "successful" write of the event occurs when there has been a successful write of the event to the persistent main memory and where the event has been written to the volatile memory. After a successful write, the thread may be returned back to the event provider (act 304) with very low latency as mentioned above.

Although acts 302 and 303 are illustrated as occurring in parallel, in one embodiment, the write to the volatile log cache in the volatile memory (act 303) actually occurs before the write to the persistent log cache structure in the persistent main memory (act 302). This is helpful in embodiments in which the write to the volatile cache first determines the position. For instance, the Log Sequence Number (or LSN) represents the position of the write in the volatile log cache. In this case, the log management component 201 generates the LSN to represent the position of the event so that proper mirroring can occur. In this embodiment, the log management component 201 would do the following in sequence 1) find the LSN based on current volatile log cache, 2) copy the event content in the current volatile log cache, 3) find the persistent main memory location based on the LSN, and 4) copy the event content also to that position of the persistent main memory.

For instance, FIG. 2 essentially shows four occurrences of the method of FIG. 3. First, the log management component 201 detects that event A is to be written (act 301). The log management component 201 then successfully writes event A to whichever of the persistent log cache structures is presently active (in the example, log cache structure 231A) as represented by arrow 213A (act 302). Furthermore, the log management component 201 also writes the event A to whichever of the volatile log caches is presently active (in the example, log cache 221A) as represented by arrow 212A (act 303). At that point, the thread is returned (as represented by arrow 214A) to the event provider 210A (act 304).

Next, the log management component 201 detects that event B is to be written (act 301). The log management component 201 then successfully writes event B to active log cache structure 231A as represented by arrow 213B (act 302). Furthermore, the log management component 201 also writes the event B to the active volatile log cache 221A as represented by arrow 212B (act 303). At that point, the thread is returned (as represented by arrow 214B) to the event provider 210B (act 304). Next, the log management component 201 detects a change in the active log caches from log caches 221A and 231A to log caches 221B and 231B. In response, the log management component 201 pre-serializes the events of the active log caches 221A and 221B to memory and serializes the events into the log 241 on the persistent store 240, as will be described with respect to FIG. 4.

Thirdly, the log management component 201 detects that event C is to be written (act 301). The log management component 201 then successfully writes event C to whichever of the persistent log cache structures is presently active (in the example, log cache structure 231B due to the detected change in active log caches) as represented by arrow 213C (act 302). Furthermore, the log management component 201 also writes the event C to whichever of the volatile log caches is presently active (in the example, log cache 221B due to the detected change in active log caches) as represented by arrow 212C (act 303). At that point, the thread is returned (as represented by arrow 214C) to the event provider 210C (act 304).

Finally, the log management component 201 detects that event D is to be written (act 301). The log management component 201 then successfully writes event D to active log cache structure 231B as represented by arrow 213D (act 302). Furthermore, the log management component 201 also writes the event D to the active volatile log cache 221B as represented by arrow 212D (act 303). At that point, the thread is returned (as represented by arrow 214D) to the event provider 210D (act 304). At this point, the example of events A through D ends. However, this process may continue indefinitely, one thread and event after the other, with returns of the thread occurring promptly.

Figure 4:
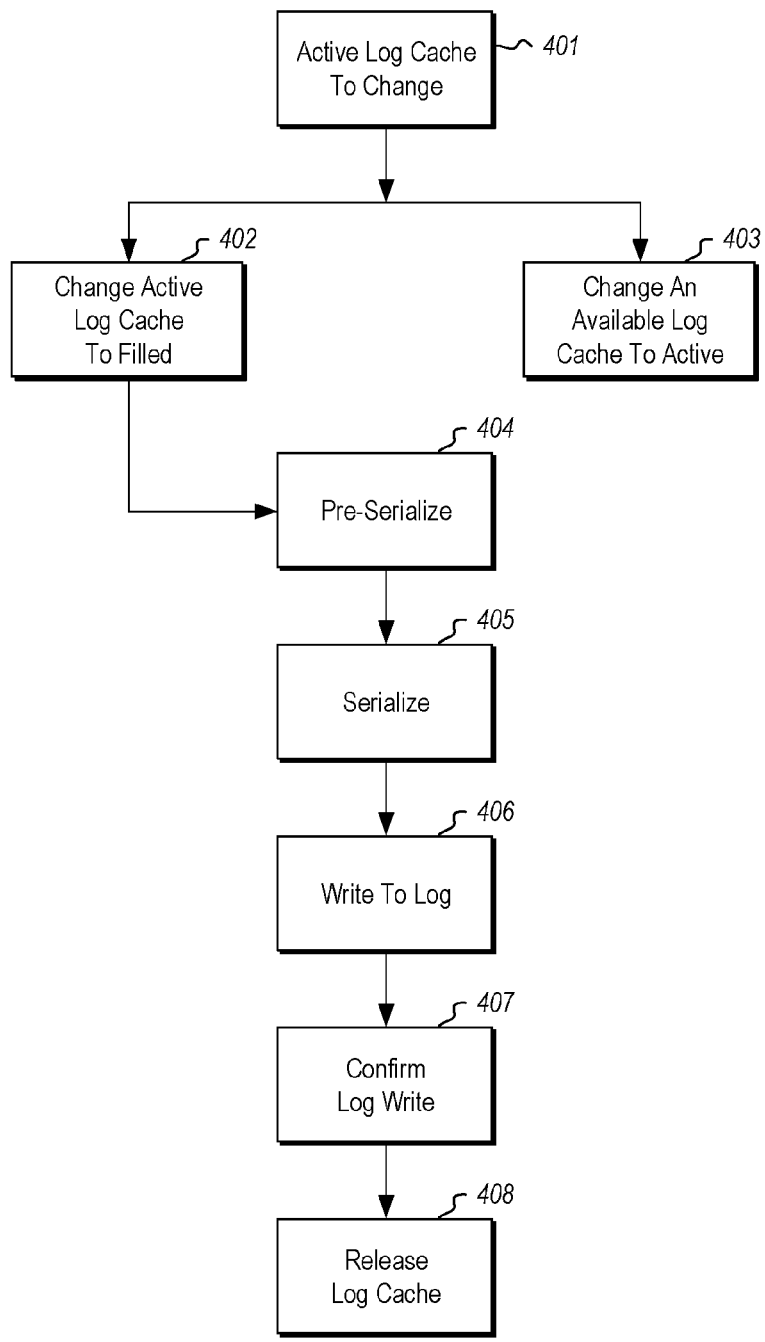
FIG. 4 illustrates a flowchart of a method for serializing a log cache into the log of a persistent store.

FIG. 4 illustrates a flowchart of a method 400 for serializing a log cache into the log. The method 400 may be performed in the context of the system 200 of FIG. 2. Accordingly, the method 400 of FIG. 4 will now be described with frequent reference to the system 200 of FIG. 2. The method 400 may be performed by, for instance, the log management component 201 of FIG. 2.

The method 400 is initiated upon detecting that the active log cache is to change (act 401). This might occur, for instance, if the log cache has become sufficiently full. Alternatively, this might occur upon the earlier of the log cache becoming sufficient full, or a particular amount of time having passed. For instance, in the event A through D example of FIG. 2, the log management component 201 detected that there was to be a change in the active log cache between the time that event B was written to the log cache and the time that event C was written to the log cache.

Upon detecting that the active log cache is to change, the previously active log cache changes its state to filled (act 402), and a previously inactive log cache change its state to active (act 403). A filled state means that the log cache can no longer receive events and is to be written into the log. An active state means that the log cache can receive events. For instance, in the events A through D example of FIG. 2, the persistent log cache structure 231A became filled (act 402) and persistent log cache structure 231B became active (act 403) after event B was written to the log cache but before event C was written to the log cache. In the embodiment in which the volatile memory 220 is also used, volatile log cache 221A became filled (act 402) and volatile log cache 221B became active (act 403) after event B was written to the log cache but before event C was written to the log cache.

The content of the log cache is then pre-serialized (act 404), serialized (act 405), and then written into the log 241 (act 406). Pre-serialization (act 404) is optional but helps to efficiently serialize the events for storage and/or efficiently store the events in the log. Examples of pre-serialization include movement to more efficiently remove empty space (such as slot array movement), checksum generation and insertion, encryption, byte stuffing, compression, and/or the like.

The resulting pre-serialized content is then serialized (act 405) for transmission over the I/O channel to the persistent storage. For instance, in FIG. 2, the optional pre-serialization and serialization of the contents of persistent log cache structure 231A is represented by arrow 215A. However, if the volatile log caches are employed, it is the content of the volatile log cache 221A that will be subject to pre-serialization and serialization as represented by arrow 215B.

Once the content is safely stored in the log (act 406), the log management component confirms the storage (act 407), and then releases the log cache into the available state (act 408). The available state means that the log cache is not currently being written to, but is available to the log management component to change into an active state when the log management component so instructs. For instance, in FIG. 2, once the write 215A or (in the case of employing volatile log caches) write 215B is confirmed as having been completed into the log (act 407), the log caches 221A and 231A each become available to become active once the log management component 201 decides to use them again. In that case, the content of the previously filled log caches are invalidated as they are no longer needed, and may be safely be written over in the future. Alternatively, the log caches may be reinitialized with default values and/or schemas in preparation for future use.

It is usually at this point that all the threads that have written events into that log cache are finally released. However, rather than wait until the log cache is flushed before batch releasing all the entrapped threads, the threads were released upon each completion of method 300, one after the other. In present technology, this reduces latency from milliseconds to potentially single-digit microseconds.

Figure 5:
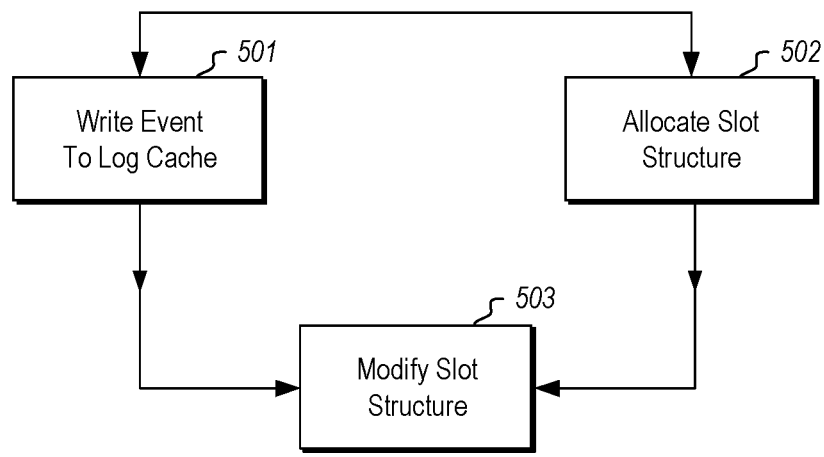
FIG. 5 illustrates a flowchart of a method for successfully writing an event into the persistent memory.

FIG. 5 illustrates a flowchart of a method 500 for successfully writing an event into the persistent memory. The method 500 is an example of the act 302 of FIG. 3, and is used to explain some remaining structures within the persistent main memory 230 illustrated in FIG. 2. The method 500 includes writing the event into a log cache structure of the persistent main memory (act 501), and also allocating a slot structure to the event (act 502). Accordingly, the persistent main memory 230 of FIG. 2 is illustrated as including a plurality of slot structures 232. The slot structures may be relatively small as they are not complex. The slot structure are then modified (act 503) to represents where the event is written in the log cache structure, and to preserve order information representing an order in which the event was written in the context of other events also written to the log cache structure.

In one embodiment, this preservation of ordering and position of slots is preserved using a linked list of slot structures with a log cache descriptor at its root. For instance, there may be one log cache descriptor in the persistent main memory associated with each persistent log cache structure in the persistent main memory. For instance, FIG. 2 shows that the persistent main memory 230 also includes log cache descriptors 233. There is one log cache descriptor corresponding to each of the persistent log cache structures. For instance, log cache descriptor 233A corresponds to persistent log cache 231A. Likewise, log cache descriptors 233B through 233D correspond to respective persistent log cache structures 231B through 231D.

An example of the use of such linked lists to track position and ordering of events within a persistent log cache structure will now be described with respect to FIGS. 6A through 6C, which show example subsequent states of the linked list as two event writes are made to a log cache.

Figure 6A:
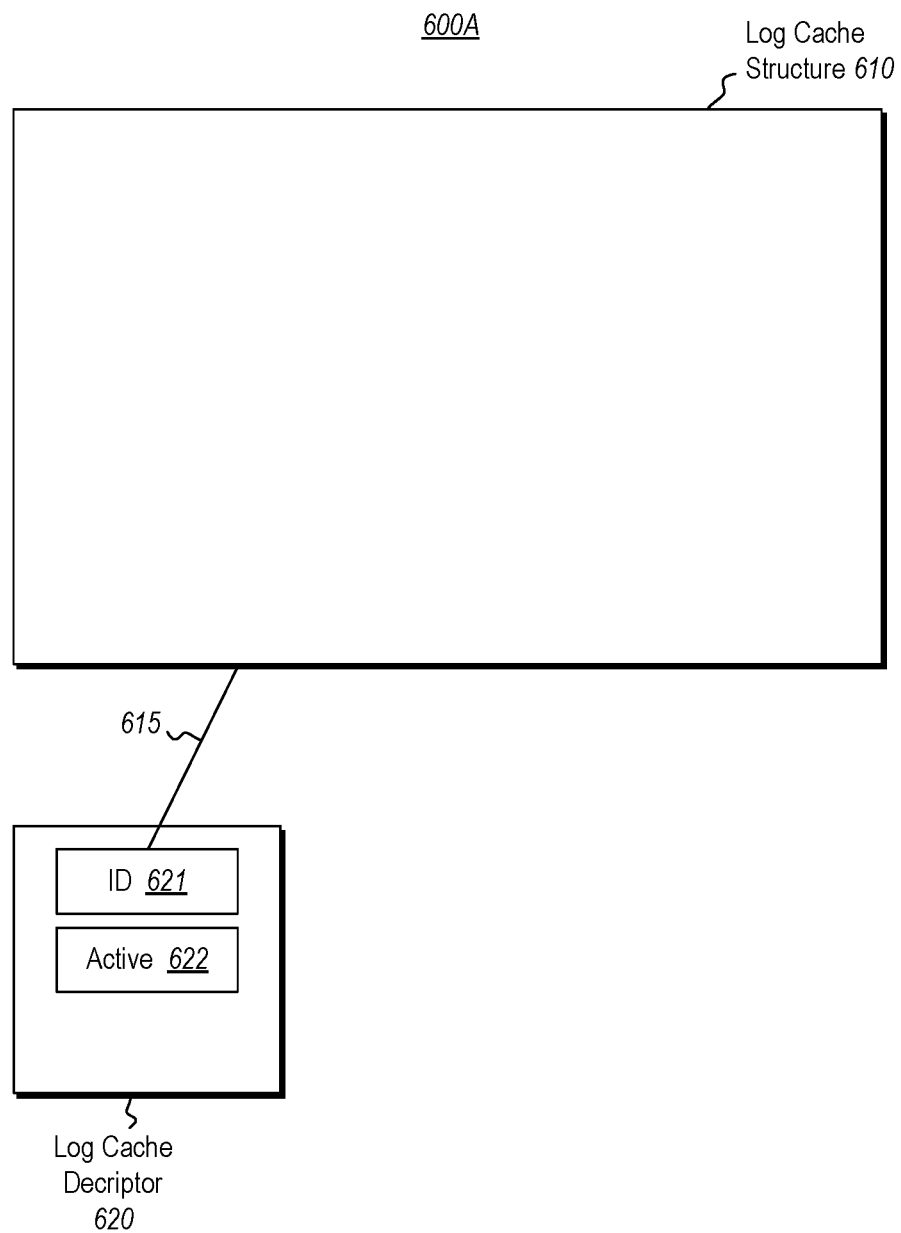
FIG. 6A through 6C show successive states of portions of persistent main memory including a log cache data structure, a log cache descriptor and one or more slot structures, that are interrelated in a manner to describe the state of the log cache structure and preserve ordering of event writes.
Figure 6B:
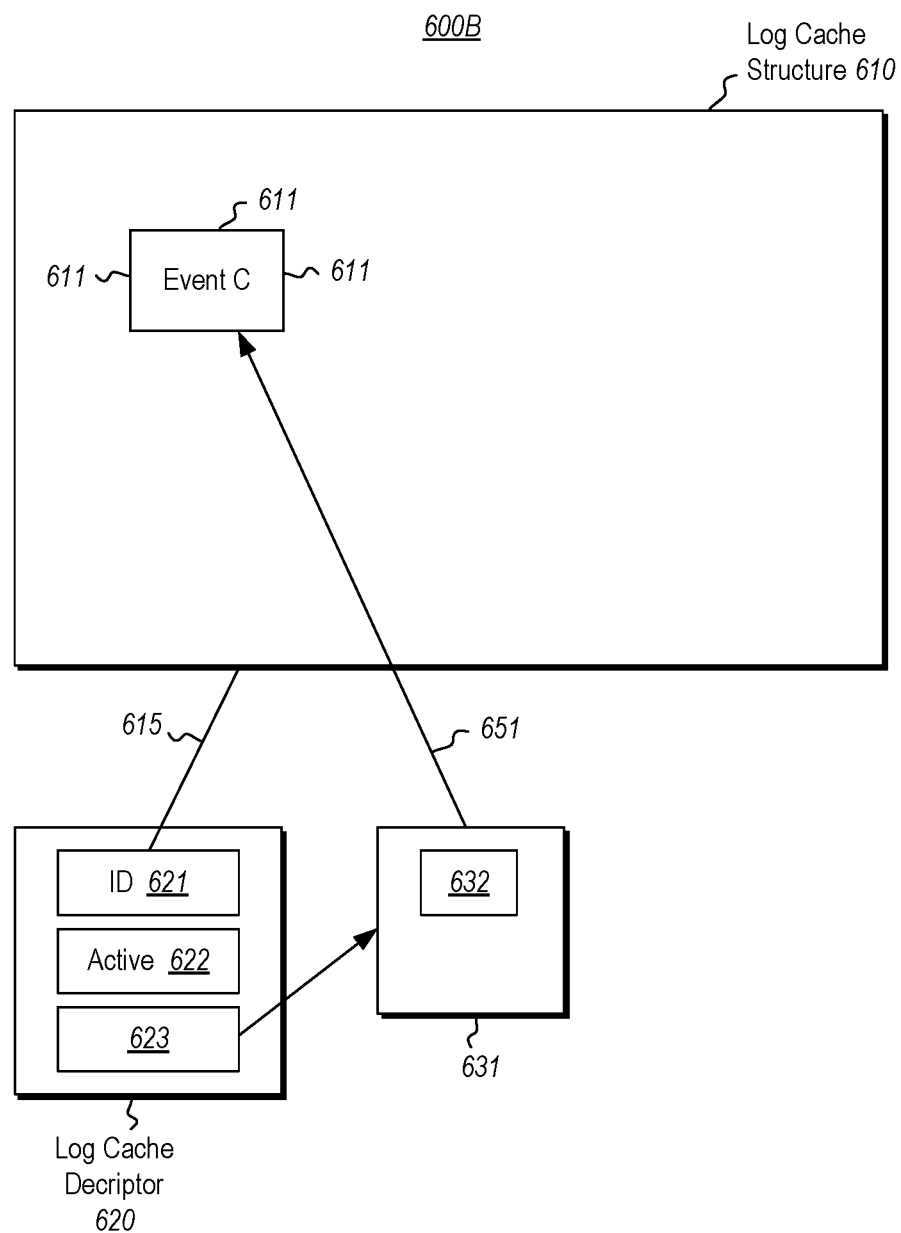
Figure 6C:
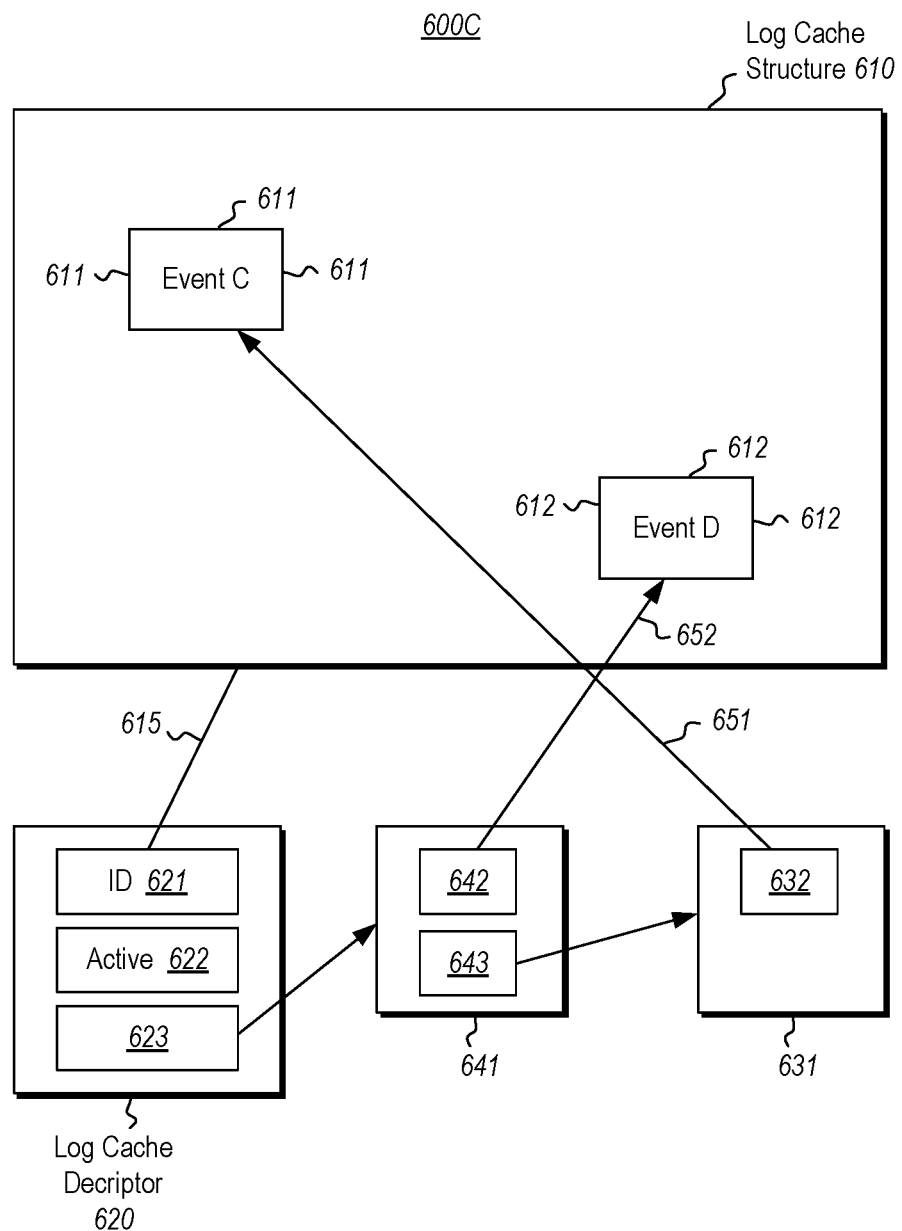

FIG. 6A illustrates an initiate state 600A in which a log cache structure 610 is empty, but the corresponding log cache descriptor 620 indicates a status of active. As an example, log cache structure 610 may represent the persistent log cache structure 231B of FIG. 2 just after the persistent log cache structure becomes active (before event C is written to it), and is thus still empty. The log cache descriptor 620 includes a log cache descriptor identifier field 621 which represents a logical association with the log cache structure (as symbolized by line 615). The log cache descriptor 620 also includes a status field 622 having a value of "active".

Now suppose that an event is to be written to the log cache structure 610. For instance, event C was first written to the log cache structure 231B in the example of FIG. 2. The event is written to the log cache structure (act 501) and a slot structure is allocated. For instance, in FIG. 6B, the state 600B shows that event C has been written at position 611. Furthermore, slot structure 631 has been allocated. Slot structure 631 may, for instance, by one of the slot structures 232 of FIG. 2.

The slot structure is modified (act 503) to identify the position of the event written to the log cache structure, and to preserve ordering of events. Referring to FIG. 6B, the slot structure 631 is associated with the log cache structure 610 by having it being pointed to by a pointer 623 within the log cache descriptor 620 of the log cache structure 610. The slot structure 631 also includes a location description 632 that points to (as represented by arrow 651) the location 611 of event C within the log cache structure 610. This description could include, for instance a pointer to a begin address of the position 611 as well as a size of the position 611. At this point, a recovery component (such as recovery component 202) could use the state 600B to recover the volatile log cache 221B to the state it was in after event C was written, but before event D was written.

Now suppose that another event is to be written to the log cache structure 610. For instance, event D was next written to the log cache structure 231B in the example of FIG. 2. The event is written to the log cache structure (act 501) and a slot structure is allocated. For instance, in FIG. 6C, the state 600C shows that event D has been written at position 612. Furthermore, slot structure 641 has been allocated. Slot structure 641 may, for instance, by one of the slot structures 232 of FIG. 2.

The slot structure is modified (act 503) to identify the position of the event written to the log cache structure, and to preserving ordering of events. Referring to FIG. 6C, the slot structure 641 includes a location description 642 that points (as represented by arrow 652) to the location 612 of event D within the log cache structure 610. This description could include, for instance, a pointer to a begin address of the position 612 as well as a size of the position 612. The slot structure 641 is first modified to have a pointer 643 to the previous first slot structure 631 in the linked list. The pointer 623 within the log cache descriptor 620 is then modified to point to the new slot structure 641. Accordingly, at this point, a recovery component (such as recovery component 202) could use the state 600C to recover the volatile log cache 221B to the state it was in after events C and D were written, and could also know (based on order in the linked list) that event C occurred before event D.

Figure 7:
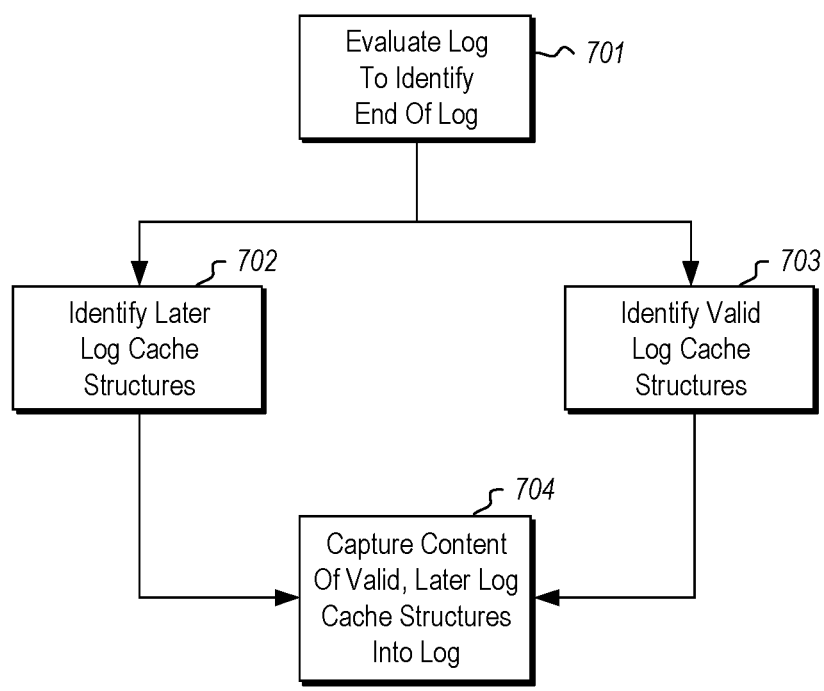
FIG. 7 illustrates a flowchart of a method for recovering a computing system using a log persisted in a persistent store as well as persistent main memory.

FIG. 7 illustrates a flowchart of a method 700 for recovering a computing system using a log persisted in a persistent store as well as persistent main memory. For instance, the method 700 may be performed by the recovery component 202 of FIG. 2. Accordingly, the recovery method 700 of FIG. 7 will now be described with frequent reference to the system 200 of Figure. In this example, failure occurred before the content of persistent log cache 231A was written into the log 241 of the persistent store, but after events C and D had been written to the persistent log cache 231B.

The recovery component evaluates the log in the persistent store to identify the end of the stored log (act 701). Then, the recovery component identifies the tail of the log in the persistent main memory by identifying any log cache structures that have events after the end of the stored log (act 702). In the example of FIG. 2, suppose that the content of neither of the persistent log cache structures 231A and 231B has made it into the log 241 of the persistent store 240. In that case, both of the persistent log cache structures 231A and 231B are after the end of the 241, and thus include the tail of the log.

It is also confirmed that the content of the log cache structure is valid (act 703). The contents of the log cache structure are valid if it is confirmed that the content is in a state consistent with being between event writes. In this case, suppose that persistent log cache structures are both valid.

For each of the identified valid log cache structures that are not serialized in the log, the recovery component then captures serialized content of the log cache structure into the log in the persistent store (act 704). This is done one log cache structure at a time and occurs in the proper temporal ordering such that earlier log cache structures are serialized into the log earlier than later log cache structures. In the case that volatile log caches are used, this capturing may use the existing pre-serialization and serialization processes already available to the volatile log cache. For instance, the contents of the log cache structure may be first copied into the corresponding log cache in volatile memory, and then this content is written (using optional pre-serialization and serialization) from the volatile log cache into the log of the persistent store consistent with acts 404 through 406 previously described.

Accordingly, an effective mechanism for logging has been described in which the latency is significantly reduced between the time that a thread initiates a write of an event to the log, and the time that the thread is returned. Threads no longer need to wait until the entire log cache is serialized into the log before performing other work. Furthermore, in some embodiments in which volatile memory is used to have log caches that mirror the log caches in persistent main memory, the pre-serialization processes need not be changed, and so recovery is possible even if failure occurs during pre-serialization.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
  persistent main memory;
  one or more event writing components that request logging of events;
  persistent storage that has therein a log of events;
  a recovery component that is triggered during recovery to use the log in persistent storage as well as events written to the persistent main memory in order to perform recovery; and
  a log management component that causes events, that the writing component(s) request be logged, to be written to the persistent main memory in a manner that the recovery component would log the event in case of recovery, the event being written into the persistent main memory prior to the event being written along with other accumulated events into the log in the persistent store, the log management component causing threads for each of at least some of the event writes to be returned after the event is written to the persistent main memory but before the event is written to the log in the persistent storage.

2. The system in accordance with claim 1, further comprising:
a volatile memory having a log cache, the log management component also causing the events, that the writing component(s) request be logged, to be written to the log cache in the volatile memory.

3. The system in accordance with claim 2, the log management component periodically writing contents of the log cache to the log in the persistent store via a serializer.

4. The system in accordance with claim 2, the persistent main memory having a log cache that mirrors the log cache of the volatile memory, the written event and the other accumulated events being included within the log cache of the volatile memory and the log cache of the persistent main memory.

5. The system in accordance with claim 2, the log management component further configured to invalidate the written event and the accumulated events in the persistent main memory when the event and the accumulated events are all written into the log of the persistent store.

6. The system in accordance with claim 1, the persistent main memory comprising a plurality of log cache structures that are usable in sequence for filling with events.

7. The system in accordance with claim 6, the persistent main memory further comprising a plurality of slot structures, each of at least some of the plurality of slot structures being usable for association with a corresponding log cache structure, to describe where an event is written into the corresponding log cache structure, and to preserve ordering information of events written into the corresponding log cache structure.

8. The system in accordance with claim 7, each of the at least some of the plurality of slot structures preserving ordering information by its order within a linked list of slot structures that have a log cache descriptor data, the log cache descriptor data structure identifying the log cache structure and indicating a status of the log cache structure.

9. A method for logging events of a computing system so as to enable the computing system to recovery for a possible failure, the method comprising:
an act of detecting that a thread requests to write an event for purposes of logging;
in response to the act of detecting, an act of writing the event into a persistent main memory prior to the event along with other accumulated events into a log in a persistent store, the event being written into the persistent main memory in a manner that a recovery component can cause the event to be logged if the recovery component is triggered to recover the computing system; and
after the act of writing the event into the persistent main memory, but before writing the event along with other accumulated events into the log in the persistent store, an act of returning the thread that requested the write of the event.

10. The method in accordance with claim 9, further comprising the following in response to the act of detecting:
an act of writing the event into a log cache in a volatile memory, the writing of the event along with the other accumulated events into the log occurring by writing contents of the log cache from volatile memory to the log in the persistent store.

11. The method in accordance with claim 10, the act of writing the event into the persistent main memory comprising an act of writing the event into a log cache in the persistent main that mirrors the log cache in the volatile memory.

12. The method in accordance with claim 9, the act of writing the event into the persistent main memory comprising:
an act of writing the event into a log cache structure of the persistent main memory;
an act of allocating a slot structure to the event, the slot structure also being within the persistent main store; and
an act of modifying the slot structure so as to represents where the event is written in the log cache structure, and to preserve order information representing an order in which the event was written in the context of other events also written to the log cache structure.

13. The method in accordance with claim 9, the thread being a first thread, the event being a first event, the method further comprising:
an act of detecting that a second thread requests to write a second event for purposes of logging;
in response to the act of detecting that the second thread requests to write the second event, an act of writing the second event into a persistent main memory prior to the second event along with other accumulated events into the log in the persistent store, the second event being written into the persistent main memory in a manner that the recovery component can cause the event to be logged if the recovery component is triggered to recover the computing system; and
after the act of writing the second event into the persistent main memory, but before writing the second event along with other accumulated events into the log in the persistent store, an act of returning the second thread that requested the write of the second event.

14. The method in accordance with 13,
the act of writing the first event into the persistent main memory comprising an act of writing the first event into a log cache structure of the persistent main store; and
the act of writing the second event in the persistent main memory comprising: an act of writing the first event into the log cache structure of the persistent main store in a manner that preserves ordering between the first event and the second event.

15. The method in accordance with 13,
the act of writing the first event into the persistent main memory comprising an act of writing the first event into a first log cache structure of the persistent main store; and
the act of writing the second event in the persistent main memory comprising: an act of writing the first event into a second log cache structure of the persistent main store.

16. A method for recovering a computing system using a log persisted in a persistent store as well as persistent main memory, the method comprising:
an act of evaluating the log in the persistent store to identify an end of the stored log;
an act of identifying a tail of the log in the persistent main memory by identifying one or more log cache structures that have events after the end of the stored log and which are validly usable for recovery; and
an act of capturing serialized contents of each of the identified one or more log cache structures into the log in the persistent store.

17. The method in accordance with claim 16, the contents of the log cache structure being valid if it is confirmed that the content is in a state consistent with being between event writes.

18. The method in accordance with claim 16, the one or more log cache structures comprising a plurality of log structures.

19. The method in accordance with claim 18, the act of capturing the serialized contents occur in temporal ordering for the plurality of log cache structures such that earlier log cache structures are serialized into the log earlier than later log cache structures.

20. The method in accordance with claim 16, the act of capturing serialized contents comprising the following for at least a particular log cache structure:
- an act of copying contents of the log cache structure into a corresponding log cache in volatile memory; and
- an act of writing the contents of the log cache structure from the corresponding log cache in volatile memory into the log in the persistent store.

\* \* \* \* \*